US009996780B2

(12) United States Patent
Zhao et al.

(10) Patent No.: US 9,996,780 B2
(45) Date of Patent: Jun. 12, 2018

(54) SPECIFIC BAR CODE AND FORMING METHOD OF THE SAME (71) Applicant: WOCHACHA INFORMATION TECHNOLOGY (SHANGHAI) CO. LTD., Shanghai (CN)

(72) Inventors: Lixin Zhao, Shanghai (CN); Wei Guo, Shanghai (CN)

(73) Assignee: Wochacha Information Technology (Shanghai) Co. Ltd., Shanghai (CN)

(*) Notice: Subject to any disclaimer, the term of this patent is extended or adjusted under 35 U.S.C. 154(b) by 0 days. days.

(21) Appl. No.: 15/309,450

(22) PCT Filed: May 4, 2015

(86) PCT No.: PCT/CN2015/078180
§ 371 (c)(1),
(2) Date: Nov. 8, 2016

(87) PCT Pub. No.: WO2015/169185
PCT Pub. Date: Nov. 12, 2015

(65) Prior Publication Data
US 2017/0220916 A1 Aug. 3, 2017

(30) Foreign Application Priority Data

May 8, 2014 (CN) .......................... 2014 1 0193210
Aug. 18, 2014 (CN) .......................... 2014 1 0405822

(51) Int. Cl.
G06K 19/06 (2006.01)
(52) U.S. Cl.
CPC ... *G06K 19/06028* (2013.01); *G06K 19/0614* (2013.01)
(58) Field of Classification Search
CPC .. G06K 7/1443; G06K 9/00577; G06K 19/14; G06K 1/121; G06K 2009/0059;
(Continued)

(56) References Cited

U.S. PATENT DOCUMENTS 7,185,816 B1    3/2007  Shoobridge
7,497,379 B2 *  3/2009  Chen ..................... G06K 19/08
                                           235/454

(Continued)

FOREIGN PATENT DOCUMENTS

CN    101251900 A    8/2008
CN    102147873 A    8/2011
(Continued)

OTHER PUBLICATIONS

PCT Search Report, dated Jul. 17, 2015.
Chinese Patent Office Search Report, dated Aug. 18, 2014.

*Primary Examiner* — Thien M Le
(74) *Attorney, Agent, or Firm* — Dority & Manning, P.A.

(57) ABSTRACT

The present disclosure discloses a specific bar code and a forming method of the bar code, comprising: forming without a particular order on the printing stock: at least a one-dimensional bar code and color information and/or grayscale information in an area corresponding to the one-dimensional bar code, which are superimposed on the printing stock, respectively, wherein data information is generated by identifying the color information and the grayscale information; and if acquired by a portable electronic device having an image capture function, identifying the one-dimensional bar code and the color information and/or grayscale information, respectively, wherein a false positive ratio of identifying the one-dimensional bar code is less than 40%. By superimposing colorful background on the one-dimensional bar code, the present disclosure expands the coding capacity and implements one-code-for-one-article identification so as to bring additional values to vendors for applications such as traceability of one code for one article, while maintaining the features of one-dimensional bar code.

22 Claims, 3 Drawing Sheets

One-Dimensional Bar Code

Color A  Color B  Color C  Color D
Two-Dimensional Bar Code based on Colorful Background (58) Field of Classification Search
CPC ....... G06K 2009/3225; G06K 2209/01; G06K 7/10722; G06K 7/1413; G06K 9/4604
USPC ........................................................ 235/494
See application file for complete search history.

(56) References Cited

U.S. PATENT DOCUMENTS

| | | | |
|---|---|---|---|
| 7,995,196 B1* | 8/2011 | Fraser | G06K 9/00577 356/71 |
| 8,308,068 B2 | 11/2012 | Morgana et al. | |
| 2008/0023647 A1* | 1/2008 | Patel | G01T 1/04 250/473.1 |
| 2011/0155815 A1 | 6/2011 | Jarvis et al. | |
| 2013/0261019 A1* | 10/2013 | Lin | C12Q 1/6825 506/9 |
| 2013/0320099 A1* | 12/2013 | Acton | G06K 19/06056 235/494 |
| 2014/0027516 A1 | 1/2014 | Fushiki | |
| 2014/0355069 A1* | 12/2014 | Caton | H04N 1/0087 358/3.28 |
| 2017/0236037 A1* | 8/2017 | Rhoads | G06K 9/6215 |

FOREIGN PATENT DOCUMENTS

| | | |
|---|---|---|
| CN | 102150169 A | 8/2011 |
| CN | 203300135 U | 11/2013 |
| EP | 1918856 A1 | 5/2008 |

\* cited by examiner

FIG. 1

One-Dimensional Bar Code

Two-Dimensional Bar Code based on Colorful Background

One-Dimensional Bar Code

Color A    Color B    Color C    Color D

Two-Dimensional Bar Code based on
Colorful Background

FIG. 4

SPECIFIC BAR CODE AND FORMING METHOD OF THE SAME

The present application claims a domestic priority of the Chinese patent application No. 201410193210.7, all contents of which are incorporated herein by reference.

TECHNICAL FIELD

The present disclosure relates to a bar code, and more specifically relates to a specific bar code and a forming method of the bar code.

BACKGROUND

At present, one-dimensional bar codes and two-dimensional bar codes are prevalently adopted in various fields as identifiers in goods circulation, storage, and other procedures. One-dimensional bar codes are still popularly used in many conventional fields such as the consumption fields of cigarettes, foods, and various kinds of commodities.

Bar codes technologies are developed during computer application development for the purpose of eliminating the "bottleneck" of data entry, which may be the "oldest" automatic identification technologies. In 1973, the American Uniform Code Council selected IBM's bar code system as the Universal Product Codes (UPCs) for the North America, to apply to the food retailing industry. With the bar code technology, automatic sale greatly facilitates food circulation. Now, as an automatic identification technology widely applied to fields such as commerce, postal services, book management, storage, transportation, industrial production process control, the UPC codes have played a significant role in current automatic identification technologies due to its advantages such as a quick input speed, a high accuracy, a low cost, and a strong reliability.

Figure 1:
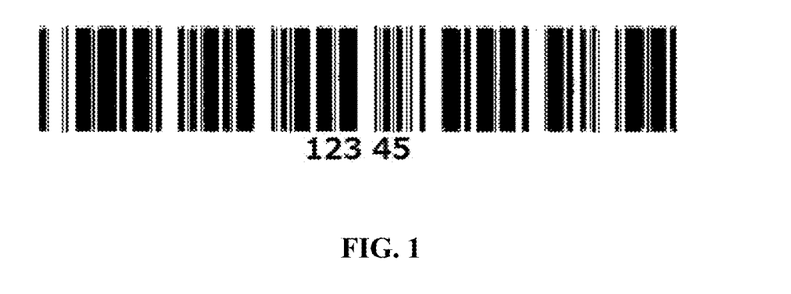
FIG. 1 illustrates a schematic diagram of a one-dimensional bar code.

As illustrated in FIG. 1, a bar code is a label consisting of a regularly arranged group of bars, nulls, and corresponding characters. A "bar" refers to a portion having a lower light reflectivity, and a "null" refers to a portion with a higher light reflectivity. Data formed by these bars and nulls may express certain information and can be read by a specific device and translated into binary and decimal information compatible to the computer. Usually, the code for each article is unique; and for common one-dimensional bar codes, correspondence should be established between the bar codes and commodities through a database. When data of a bar code is communicated to the computer, an application on the computer will operate on and process the data. Therefore, a common one-dimensional bar code is only used as identification information during its use. Its significance is implemented by extracting corresponding information from the database of the computer system. Common code systems for one-dimensional codes include EAN code, 39 code, cross 25 code, UPC code, 128 code, 93 code, ISBN code and Codabar, etc.

Different code systems are applied to different fields.

EAN code is an internationally universal symbol system. It is a meaningless bar code with a fixed length. All of the information as expressed is digits, mainly for identifying commodities.

39 code and 128 code are code systems customized within current domestic enterprises. Length and information of the bar code may be determined as needed. Information encoded thereby may be digits, or may contain alphabets. They are mainly applied to industrial production line fields, book managements, etc.

93 code is a bar code similar to 39 code. It has a relatively high density and can replace the 39 code.

25 code is mainly applied to package, transportation, and ticket sequence numbering of international airline systems.

Codabar is applied to tracking management in a blood bank, a library, and for packages, etc.

ISBN is used for book management.

Coding of a one-dimensional bar code is unique. For example, an EAN-13 code consists of a prefix, a manufacturer identification code, a commodity item code, and a check code. The prefix is a code used by the international EAN organization to identify a respective member organization, which is 690-695 for China. The manufacturer code is a code assigned by the EAN coding organization to a manufacturer based on the prefix assigned by EAN. The commodity item code is autonomously coded by the manufacturer. The check code is for checking correctness of the code. When compiling the commodity item code, the manufacture has to follow the basic principle of commodity coding. That is, a same commodity item has to be compiled with a same commodity item code and different commodity items have to be compiled with different commodity item codes. The one-dimensional bar code only expresses information in one direction (usually in the horizontal direction), and it does not express any meaning in the vertical direction. Its certain height is only for facilitating the reader to align. Application of the one-dimensional code may improve the speed of information entry and reduce error rate. However, the one-dimensional bar code also has some drawbacks such as a smaller data volume (about 30 characters), only containing alphabets and digits, a relatively large size of the bar code (i.e., a lower space utilization), and not being able to be read once the bar code is damaged. Now, applications like commodity tracing require one code for one article, i.e., each commodity has a unique identification. However, due to coding capacity of the one-dimensional bar code, each code of the one-dimensional bar codes indicates one kind of commodities, i.e., one code for one kind, which cannot identify the uniqueness of a single commodity. Therefore, with precondition of all natures of the legacy one-dimensional codes maintain unchanged, implementation of one-code-for-one-article identification by increasing the capacity of current one-dimensional bar code can bring additional values to vendors for all applications such as traceability due to one code for one article.

SUMMARY

Based on the above understanding of the technical background and the existing technical problems, a method of increasing a capacity of a current one-dimensional bar code while maintaining all natures of legacy one-dimensional codes unchanged will be very beneficial.

According to a first aspect of the present disclosure, there is provided a forming method of a specific bar code. The specific bar code is superimposed with different color information and/or grayscale information on a same one-dimensional code. The method comprising steps of: providing a printing stock; forming without a particular order on the printing stock: at least a one-dimensional bar code and color information and/or grayscale information in an area corresponding to the one-dimensional bar code, which are superimposed on the printing stock, respectively, wherein data information is generated by identifying the color information and/or the grayscale information; and if a device identifies information of the one-dimensional bar code and the color information and/or the grayscale information, or if the device only identifies the information of the one-dimensional bar code, a false positive rate of identifying the information of the one-dimensional bar code is less than 40%.

According to one embodiment of the present disclosure, the one-dimensional bar code comprises bars and nulls; and the color information and/or the grayscale information is information superimposed or partially superimposed on the bars and/or the nulls; the color information is represented by hue, saturation, and lightness, and the grayscale information is represented by a grayscale level.

According to one embodiment of the present disclosure, if the color information is superimposed on the nulls, the color information is at least one color within a varying range from pure red to light green.

According to one embodiment of the present disclosure, the at least one color includes a color with saturation greater than or equal to 90% and lightness greater than or equal to ½ if hue is greater than or equal to 0° and less than or equal to 60°.

According to one embodiment of the present disclosure, the at least one color includes a color with saturation greater than or equal to 90% and lightness greater than or equal to ¾ if hue is greater than or equal to 60° and less than or equal to 90°.

According to one embodiment of the present disclosure, if the color information is superimposed on the bars, the color information is at least one color within a varying range from pure green to reddish brown.

According to one embodiment of the present disclosure, the at least one color includes a color with lightness less than or equal to ½ if hue is greater than 120° and less than or equal to 300°.

According to one embodiment of the present disclosure, the at least one color includes a color with saturation less than or equal to 50% and lightness less than or equal to ¼ if hue is greater than 300° and less than or equal to 330°.

According to one embodiment of the present disclosure, if the grayscale information is superimposed on the bars, under a standard of 100 grayscale levels and 0 for pure white and 100 for pure black, the grayscale information is information with grayscale greater than or equal to 40.

According to one embodiment of the present disclosure, if the grayscale information is superimposed on the nulls, under a standard of 100 grayscale levels and 0 for pure white and 100 for pure black, the grayscale information is information with grayscale less than or equal to 10.

According to one embodiment of the present disclosure, when identifying the specific bar code, the information of the one-dimensional bar code and the color information and/or grayscale information are identified by the device, and the identified information of the one-dimensional bar code in conjunction with the identified color information and/or grayscale information causes the specific bar code to have a feature of one code for one article.

According to a second aspect of the present disclosure, there is provided a specific bar code based on a colorful background, comprising: a one-dimensional bar code disposed on a printing stock; and color information and/or grayscale information superimposed or partially superimposed on the one-dimensional bar code and disposed on the printing stock, wherein data information is generated by identifying the color information and/or the grayscale information.

According to one embodiment of the present disclosure, when identifying the specific bar code, information of the one-dimensional bar code and the color information and/or grayscale information are identified by the device, and the identified information of the one-dimensional bar code in conjunction with the identified color information and/or grayscale information causes the specific bar code to have a feature of one code for one article.

According to the disclosure of the present information, there is provided a two-dimensional code. Compared with the prior art, the present disclosure overcomes a technical prejudice that information capacity of a bar code may be increased only by increasing the length of the one-dimensional code or changing its coding manner. By superimposing color information and/or grayscale information on a one-dimensional code, the present disclosure not only increases information capacity of the bar code, but also makes the new bar code compatible with the legacy one-dimensional bar code technology, i.e., information of corresponding one-dimensional bar code may be read by the legacy bar code scanning device. For example, the present disclosure has the following unique advantages: 1) a one-code-for-one-kind feature in which commodities represented by a one-dimensional bar code can still be identified by all one-dimensional bar code scanning devices; 2) uniqueness of each commodity can be expressed by identifying or encoding a color sequence specific to a colorful background; and 3) one-code-for-one-article identification is implemented while maintaining all natures inherited from the legacy one-dimensional bar code unchanged, which brings additional values to vendors for all applications such as traceability of one code for one article.

BRIEF DESCRIPTION OF THE DRAWINGS

Other features, objectives, and advantages of the present disclosure will become more apparent through reading the following detailed depiction of the non-limiting embodiments with reference to the accompanying drawings.

In the drawings, same or similar reference numerals represent same or similar means (modules) or steps throughout different schematic diagrams.

DETAILED DESCRIPTION

In detailed depiction of the preferred embodiments below, drawings constituting part of the present disclosure will be referenced. The accompanying drawings exemplarily illustrate specific embodiments of the present disclosure. The exemplary embodiments do not intend to exhaust all embodiments of the present disclosure. It should be understood that other embodiments may be utilized and structural or logical modifications may also be made without departing from the scope of the present disclosure. Therefore, the specific description below is non-limitative, and the scope of the present disclosure is limited by the appended claims.

FIG. 1 illustrates a schematic diagram of a conventional one-dimensional bar code. Depiction about the diagram has been provided in the BACKGROUND, which will not be detailed here.

A standard size of a one-dimensional bar code for a commodity is 37.29 mm×26.26 mm, with a magnification power of 0.9~2.0. If the printing area allows, a one-dimensional bar code with a power of 1.0 above may be selected to satisfy reading requirements. For example, a 3*10 color block matrix may be first printed on an originally customary white base color, i.e., 3 different colors are filled onto the 3*10 color block matrix. The color block matrix should not exceed the requirements of a standard size. In order to reduce the requirements on the reading device, the color blocks in the color block matrix may be made as larger as possible, e.g., preferably considering a 3 mm*3 mm size. Of course, according to the size and demands of an actual bar code, the color blocks in the color block matrix are not necessary to be square blocks. Rectangle, square, round or any other shapes are allowed, and its size may also change as required.

Since detection of the bar code is implemented through color contrast between bars and nulls, generally, a color that can meet the requirements of contrast (pcs value) can be used. Light colors are always used for nulls, e.g., white, orange, and yellow, while deep colors are used for bars, e.g., black, dark green, dark brown, etc. Most common collocation is black bar and white null. Practical experiences of bar code detection show that red, gold, or light yellow are inappropriate for bars, while transparency and gold cannot be used for nulls. In the embodiment of the present disclosure, the bars are black, while the nulls are made of background colors and white. A person of normal skill in the art should understand that the colors for bars and nulls are not limited to black and white. Dependent on reading devices, the colors of bars and nulls may be selected as any of various other colors as needed, and colors of various color blocks in the color block matrix may also be selected as any of various colors as needed.

If the 3*10 color block matrix is selected, in one embodiment, 3 different colors are filled in the color block matrix, the maximum number of identifiable commodities represented by which is 30 powers of 3, i.e., 205891132094649 in total. That is, it may be used for identifying more than 200 trillion commodities, which should satisfy the requirements of one code for one article of merchants or other applications. A person of normal skill in the art should understand that if 3 different colors are used to fill, the size of the color block matrix may also be 4*8, 3*9, or 3*11, etc., the maximum number of identifiable commodities corresponding to which is 32 power of 3, 27 power of 3, or 33 power of 3, etc., respectively. If M color matrixes are filled with N (N is a natural number larger than or equal to 2), the corresponding identifiable number of commodities is M-power-of-N, which controllably and dramatically increases the capacity of the existing one-dimensional code so as to enable one code for one kind of commodities while reducing the complexity and difficulty of manufacturing process.

Besides, respective color blocks in the color block matrix may be discontinuous. A person of normal skill in the art should understand that the transition manner of respective color blocks in the color block matrix is not limited to that illustrated in FIG. 2. Any manner that may satisfy the requirements of the reading device is allowed, e.g., transverse connection or disconnection, longitudinal connection or disconnection.

Figure 2:
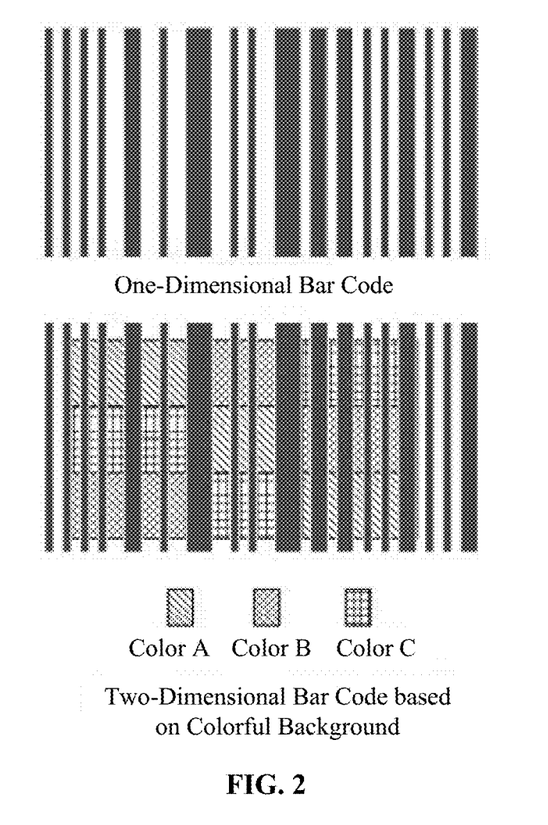
FIG. 2 illustrates a schematic diagram of a colorful two-dimensional bar code.

In an example of the present disclosure, e.g., a new two-dimensional code based on a colorful background as illustrated in FIG. 2, firstly, a one-dimensional bar code is formed on a material suitable for forming a one-dimensional bar code according to encoding rules of one-dimensional bar codes. Secondly, color information and/or grayscale information are superimposed on the formed one-dimensional bar code. A person of normal skill in the art should understand that the one-dimensional bar code in the present embodiment may be in any of the one-dimensional bar code systems. The one-dimensional bar code includes first data information, which may be a commodity serial number or a commodity item code, for example. The color information and/or grayscale information superimposed on the one-dimensional bar code includes second data information, which may be identification information of a specific commodity having the commodity serial number included in the one-dimensional bar code, for example. Generally, the commodity serial number or commodity item code represents a certain commodity, i.e., one code for one kind, while the identification information of the commodity identifies a specific article of the commodity, i.e., one code for one article. Besides, after the color information and/or grayscale information are superimposed on the one-dimensional bar code, the reading device may identify the first data information and the second data information, respectively, or identify the first data information and the second data information simultaneously. The reading device still maintains a false positive rate of lower than 40% when identifying the first data information. A person of normal skill in the art may understand that the reading device in the embodiment of the present disclosure is not limited to a portable electronic device having a function of image capture, which may also be any device that can separately identify and/or store the first data information and the second data information and satisfy the false positive rate requirements with respect to the first data information and/or the second data information, e.g., a scanner. Bar code scanners are also usually referred to as bar scanning guns/readers, which are devices for reading information contained in a bar code and may be classified into one-dimensional bar code scanners and two-dimensional bar code scanners.

A basic working principle of the scanner is that light emitted from a light source irradiates onto a bar code symbol through an optical system. Light reflected back is imaged onto a photo-electricity converter through the optical system and is interpreted by a decoder into a digital signal that may be directly accepted by a computer. The bar code scanner is widely applied to a commercial POS cashing system, express post, warehouse storage, logistics, books, clothes, medicines, banking, insurance, communication, among other fields. Main technical parameters of the bar code scanner include, e.g., a resolution, a scanning depth of field, a scanning width, a scanning speed, one-time identification rate, and an error rate. If the identification succeeds, the scanner will obtain a segment of digital codes, while if the identification fails, the digital codes will not be obtained. Particularly, the one-time identification rate indicates a ratio between the number of tags scanned and read for the first time and the total number of scanned tags. For example, if twice scanning is needed for obtaining the information of one bar code tag, the one-time identification rate is 50%. The error rate is an extremely important test index that reflects error identification conditions of a machine-identifiable label system. The error rate is equal to a ratio of the error identification times to total identification times. For a bar code system, the error rate is a more serious problem than a low one-time identification rate. By placing the specific two-dimensional code to be scanned within a working range of the scanner, an identification rate may be derived by repetitive and mechanical scanning, and the false positive rate may be derived by minus the identification rate by 100%. If the identification succeeds, the scanning gun will obtain a segment of digital codes; while if the identification fails, the digital codes will not be generated. For example, the Honeywell MS1690 two-dimensional bar code scanning gun has a resolution of 1.3 million pixels and a scanning depth of field is 0 mm-230 mm.

In one embodiment, the color block matrix containing color information and/or grayscale information may be completely superimposed onto the area of a corresponding one-dimensional bar code or partially superimposed onto the area of the corresponding one-dimensional bar code.

Figure 4:
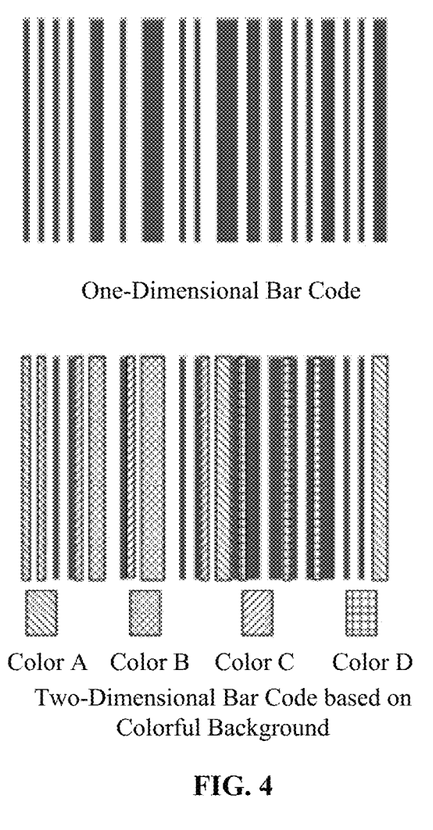
FIG. 4 illustrates another schematic diagram of a colorful two-dimensional bar code.

In one embodiment, as illustrated in FIG. 4, the color blocks in the color block matrix are rectangular, and their length may be identical to the length of bars in the longitudinal direction of the one-dimensional bar code. That is, the color block matrix contains 1*N color blocks. The color blocks in the color block matrix may be disconnected in the transverse direction. Widths of respective color blocks may be identical or different. The color block matrix is superimposed or partially superimposed on the one-dimensional bar code.

The HSL color mode is a color standard in the industrial field, which derives various colors through variations of three color channels, i.e., H (Hue), S (Saturation) and L (Lightness), and superimpositions thereof. The HSL color mode represents the colors of the hue, saturation, and lightness channels. This standard almost includes all colors perceptible by human eyes and therefore is one of most widely used color systems currently.

Figure 3:
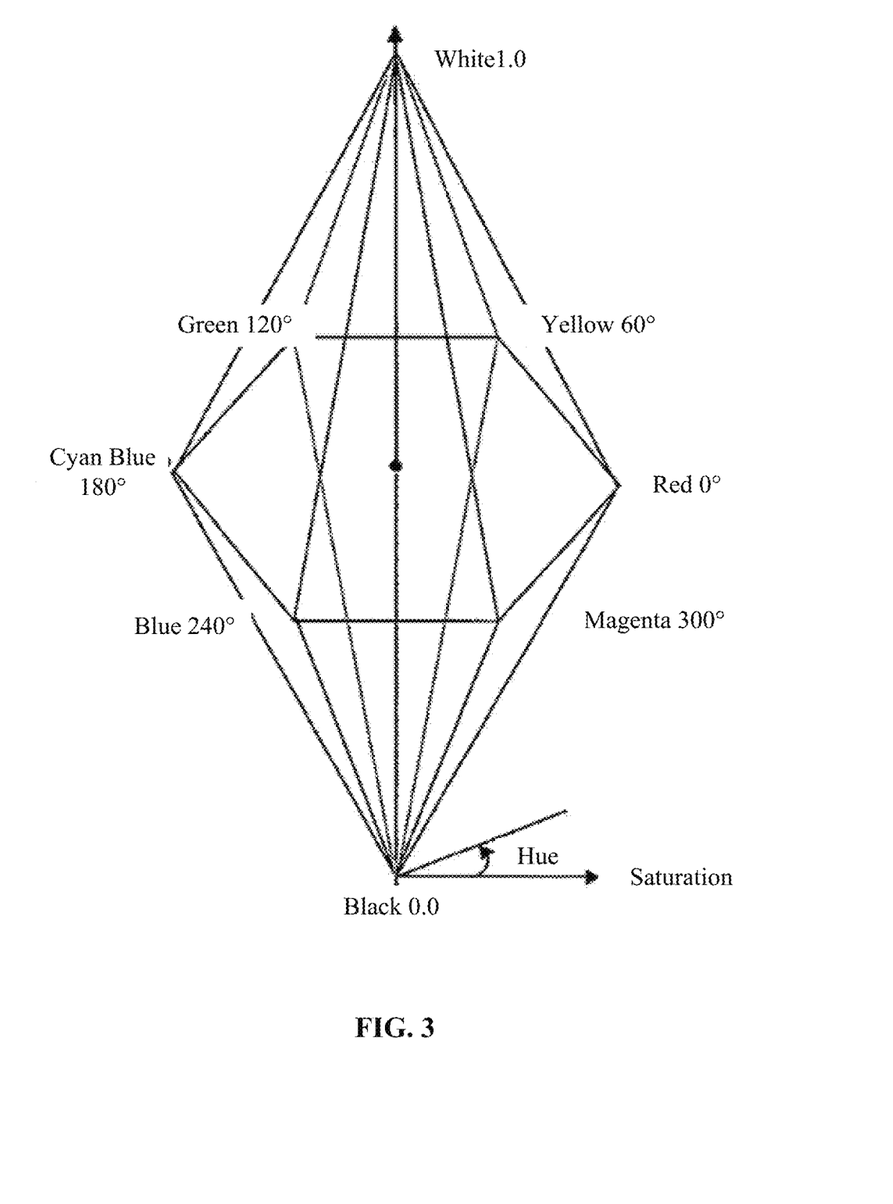
FIG. 3 illustrates a schematic diagram of hue, saturation, and lightness.

The hue component in the HSL shown in FIG. 3 represents a color range that is perceptible by human eyes. These colors are distributed on a color cycle of a plane with central angles ranging from 0°-360°, and each angle may represent a color. The significance of the hue value lies in that we may vary the color by rotating the color cycle without change of light perception. In actual applications, we need to memorize 6 main colors on the color cycle, used as basic references: 360°/0° red, 60° yellow, 120° green, 180° cyan blue, 240° blue, and 300° magenta, which are arranged on the color cycle with a spacing of 60° central angle.

The saturation component in the HSL refers to the saturation of color, which describes variation of color purity under the same hue and lightness. The larger the value is, the less the grey in the color is, and the brighter the color is, which may exhibit a variation from rationality (grayscale) to sensibility (pure color).

The lightness component in the HSL refers to the lightness of color, functioning to control dimming of the color. It also uses a value range from 0 to 1. The smaller the value is, the darker the color is, and the closer it approaches to dark; and the larger the value is, the brighter the color is, and the closer it approaches to white.

The RGB color mode is a color standard in the industrial field, which derives various colors through variations of three color channels, i.e., R (Red), G (Green) and B (Blue), and superimpositions thereof. The RGB color mode represents colors of red, green, and blue channels. The RGB color mode uses a RGB model to allocate a strength value within a 0~255 range for RGB components of each pixel in an image. Only with three colors, the RGB image may present 16777216 (256*256*256) colors on the screen by mixing them according to different proportions.

Various components in the HSL may be represented by equation (1), respectively:

$$H = \begin{cases} 0° & \text{if max} = \text{min} \\ 60° \times \frac{G-B}{\text{max}-\text{min}} + 0°, & \text{if max} = r \text{ and } g \geq b \\ 60° \times \frac{G-B}{\text{max}-\text{min}} + 360°, & \text{if max} = r \text{ and } g < b \\ 60° \times \frac{B-R}{\text{max}-\text{min}} + 120°, & \text{if max} = g \\ 60° \times \frac{R-G}{\text{max}-\text{min}} + 240°, & \text{if max} = b \end{cases} \quad (1)$$

$$L = \frac{1}{2}(\text{max} + \text{min})$$

$$S = \begin{cases} 0 & \text{if } L = 0 \text{ or max} = \text{min} \\ \frac{\text{max}-\text{min}}{\text{max}+\text{min}} = \frac{\text{max}-\text{min}}{2L}, & \text{if } 0 < L \leq \frac{1}{2} \\ \frac{\text{max}-\text{min}}{2-(\text{max}+\text{min})} = \frac{\text{max}-\text{min}}{2-2L}, & \text{if } L > \frac{1}{2} \end{cases}$$

where, max and min refer to a maximum value and a minimum value in the RGB, respectively. For example, when R=186, G=201, and B=19, max=201, and min=19.

In the embodiment illustrated in FIG. 2, if the color information is superimposed on nulls of a one-dimensional bar code and also superimposed on neighboring bars (colors superimposed on the bars are not shown visually), the color information is at least one color with a variation from pure red to light green. Optionally, when the hue in the HSL is greater than or equal to 0° but smaller than or equal to 60°, the saturation is greater than or equal to 90%, and the lightness is greater than or equal to 0.5. Table 1 lists information of three colors filled on the nulls and their corresponding identification rates according to the embodiment shown in FIG. 2. The present embodiment adopts an example of superimposing 3 colors to the 3*3 matrix color block, which may achieve an information capacity for 9 power of 3 commodities with one code for one article. Of course, N*M matrix arrangements may also be adopted to implement a larger information capacity.

TABLE 1

Information of Colors Filled on Nulls and Identification Rates

| Identification Rate | HSL1<br>RGB1 | HSL2<br>RGB2 | HSL3<br>RGB3 |
|---|---|---|---|
| 98% | 38.43°, 100%, 0.847<br>255, 227, 177 | 23.13°, 100%, 0.751<br>255, 177, 128 | 0°, 100%, 0.749<br>255, 127, 128 |
| 80% | 38.33°, 100%, 0.794<br>255, 218, 150 | 23.63°, 100%, 0.751<br>254, 151, 84 | 0°, 100%, 0.6647<br>255, 84, 84 |
| 68% | 0°, 100%, 0.6647<br>255, 84, 84 | 38.70°, 100%, 0.6961<br>255, 200, 100 | 23.53°, 100%, 0.5<br>255, 100, 0 |
| 78% | 23.53°, 100%, 0.5<br>255, 100, 0 | 60.23°, 100%, 0.5019<br>254, 255, 1 | 60°, 100%, 0.5<br>254, 0, 0 |

Optionally, if the hue in HSL is greater than 60° and smaller than or equal to 90°, the saturation is greater than or equal to 90% and the lightness is greater than or equal to 0.75. Those skilled in the art may determine that here, "light green" may represent that the hue is 90°, the saturation is 90%, and the lightness is 0.75. Table 2 lists information of colors filled on nulls and corresponding identification rates according to the embodiment as shown in FIG. 2.

TABLE 2

Information of Colors Filled on Nulls and Identification Rates

| Identification Rate | HSL1 | RGB1 |
|---|---|---|
| 64% | 60°, 100%, 0.8192 | 223, 255, 163 |
| 78% | 73.57°, 90.98%, 0.7896 | 229, 251, 170 |
| 93% | 72.31°, 100%, 0.8662 | 241, 255, 188 |

According to the experimental data above, since the overall identification rate of the matrix module combined by multiple colors depends on the lowest identification rate of a single color. In another embodiment, N (N is a nature number greater than or equal to 2) kinds of colors corresponding to the above range may be used to fill on the nulls, so as to achieve an objective of an identification rate higher than 60% and a false positive rate lower than 40% of the color information, and to significantly increase the capacity of the legacy one-dimension codes.

When the color information is superimposed on the bars of the one-dimensional bar code, the color information is at least one color within a varying range from pure green to reddish brown. Optionally, if the hue in HSL is greater than or equal to 120° and smaller than or equal to 300°, the lightness is smaller than or equal to 0.5. Optionally, if the hue in the HSL is greater than or equal to 300° and smaller than or equal to 330°, the saturation is smaller than or equal to 50%, and the lightness is smaller than or equal to 0.25. Table 3 lists information of three colors filled on the bars, i.e., filled on A, B, C, and D, as well as their corresponding identification rates. As illustrated in FIG. 4, this embodiment selects a 18-bar space for filling in colors. If 3 colors are selected and filled in the color zones corresponding to bars, an information capacity for 18 power of 3 commodities with one code for one article may be achieved. Based on filling of the bars, color information of FIG. 2 is also superimposed on nulls adjacent to the bars in another embodiment, which may correspondingly increase the information capacity with one code for one article.

TABLE 3

Information of Colors Filled on the Bars and Identification Rates

| Identification Rate | HSL1 RGB1 | HSL2 RGB2 | HSL3 RGB3 |
|---|---|---|---|
| 98% | 304.84°, 48.44%, 0.25 95, 33, 90 | 240°, 48.63%, 0.243 33, 33, 91 | 120°, 100%, 0.5 85, 171, 85 |
| 63% | 321.82°, 43.98%, 0.245 90, 35, 70 | 240°, 68.4%, 0.498 41, 41, 213 | 120°, 68.4%, 0.498 41, 213, 41 |
| 55% | 0°, 67.4%, 0.4451 190, 37, 120 | 240°, 68.4%, 0.498 41, 41, 213 | 120°, 68.4%, 0.498 41, 213, 41 |

In the specific embodiment of FIG. 4, for example, color A (e.g., pure green) may represent a hue of 120°, a saturation of 100%, and a lightness of 0.5; color B (e.g., pure blue) may represent a hue of 240°, a saturation of 100%, and a lightness of 0.5; color C (e.g., dark green) may represent a hue of 120°, a saturation of 50%, and a lightness of 0.375; color D (e.g., reddish brown) may represent a hue of 315°, a saturation of 50%, and a lightness of 0.25; wherein colors A, B, C, and D may adopt corresponding prescribed color information in HSL. Since the overall identification rate of the matrix module combined by multiple colors depends on the lowest identification rate of a single color, in another embodiment, N (N is a nature number greater than or equal to 2) kinds of colors corresponding to the above range may be filled on the bars so as to achieve an objective of an identification rate higher than 60% and a false positive rate lower than 40% of the color information, and to significantly increase the capacity of the legacy one-dimensional codes. In another embodiment, the same color information may be filled in part of each vertical bar, or the same color information may be filled in part of several adjacent bars, thereby achieving corresponding identification rate and information capacity.

Grayscale, also referred to as color gradation or gray level, refers to dimming degree of lightness. In the present application, e.g., 100 gray levels are adopted, where 0 represents pure white, and 100 represents pure black. Under a standard that there are 100 gray levels, if the grayscale information is superimposed on bars of a one-dimensional bar code, the gray level is greater than or equal to 40. In one embodiment, if the grayscale within the color range in FIG. 4 is 35, the identification rate is lower than 60%, and if the grayscales are 45 and 55, experiments show that the identification rates are higher than 60%. If the grayscale information is superimposed on nulls of the one-dimensional bar code, the grayscale is smaller than or equal to 10. In one embodiment, if the grayscale within the color range in FIG. 2 is 5, the identification rate is higher than 60%, and if the grayscales are 25 and 15, experiments show that the identification rates are lower than 60%.

Since scanning and identification of bar codes is implemented based on color contrast between bars and nulls in the bar code, those skilled in the art usually believe that color information or grayscale information may not be superimposed on the one-dimension bar code; otherwise, it will always cause the bar code not able to be correctly identified, e.g., the identification rate of the bar code is too low. According to the embodiments of the present application, those skilled in the art should understand that the present application just overcomes this technical prejudice. By superimposing the color information or grayscale information on the one-dimensional bar code, not only the information capacity of the bar code is increased, the newly derived bar code is also made compatible with the legacy one-dimension bar code technology, i.e., corresponding one-dimensional bar code information may be normally read using the legacy bar code scanning device.

To those skilled in the art, it is apparent that the present disclosure is not limited to details of the illustrative embodiments above, and without departing from the spirit or basic feature of the present disclosure, the present disclosure may be implemented in other specific forms. Therefore, in any perspective, the embodiments should be regarded as illustrative, not limitative. In addition, it is apparent that the word "comprising" should not exclude other elements and steps, and the expression "one" does not exclude plurality. A plurality of elements stated in an apparatus claim may be also be implemented by one element. Words like first and second are used to indicate names, not indicating any specific sequence.

We claim:
1. A forming method of a specific bar code, comprising:
   providing a printing stock;
   forming without a particular order on the printing stock:
   at least a one-dimensional bar code and color information and/or grayscale information in an area corresponding to the one-dimensional bar code, which are superimposed on the printing stock, respectively, wherein data information is generated by identifying the color information and/or the grayscale information; and if a device identifies information of the one-dimensional bar code and the color information and/or the grayscale information, or if the device only identifies the information of the one-dimensional bar code, a false positive rate of identifying the information of the one-dimensional bar code is less than 40%.

2. The forming method according to claim 1, wherein the one-dimensional bar code comprises bars and nulls; and the color information and/or the grayscale information is superimposed or partially superimposed on the bars and/or the nulls.

3. The forming method according to claim 2, wherein if the color information is superimposed on the nulls, the color information is at least one color within a varying range from pure red to light green.

4. The forming method according to claim 3, wherein the at least one color includes a color with saturation greater than or equal to 90% and lightness greater than or equal to ½ if hue is greater than or equal to 0° and less than or equal to 60°.

5. The forming method according to claim 3, wherein the at least one color includes a color with saturation greater than or equal to 90% and lightness greater than or equal to ¾ if hue is greater than or equal to 60° and less than or equal to 90°.

6. The forming method according to claim 2, wherein if the color information is superimposed on the bars, the color information is at least one color within a varying range from pure green to reddish brown.

7. The forming method according to claim 6, wherein the at least one color includes a color with lightness less than or equal to ½ if hue is greater than or equal to 120° and less than or equal to 300°.

8. The forming method according to claim 6, wherein the at least one color includes a color with saturation less than or equal to 50% and lightness less than or equal to ¼ if hue is greater than 300° and less than or equal to 330°.

9. The forming method according to claim 2, wherein if the grayscale information is superimposed on the bars, under a standard of 100 grayscale levels and 0 for pure white and 100 for pure black, the grayscale information is information with grayscale greater than or equal to 40.

10. The forming method according to claim 2, wherein if the grayscale information is superimposed on the nulls, under a standard of 100 grayscale levels and 0 for pure white and 100 for pure black, the grayscale information is information with grayscale less than or equal to 10.

11. The forming method according to claim 1, wherein when identifying the specific bar code, the information of the one-dimensional bar code and the color information and/or grayscale information are identified by the device, and the identified information of the one-dimensional bar code in conjunction with the identified color information and/or grayscale information causes the specific bar code to have a feature of one code for one article.

12. A specific bar code, comprising:

a one-dimensional bar code disposed on a printing stock including bars and nulls, wherein the one-dimensional bar code includes first data information, the first, data information includes a commodity serial number or a commodity item code for representing a kind of commodity; and color information and/or grayscale information superimposed or partially superimposed on the one-dimensional bar code and disposed on the printing stock, wherein the color information and/or the grayscale information includes second data information for identifying an article of commodity with the commodity serial number or the commodity item code included in the one-dimensional bar code.

13. The specific bar code according to claim 12, wherein the one-dimensional bar code comprises bars and nulls; and the color information and/or the grayscale information is superimposed or partially superimposed on the bars and/or the nulls.

14. The specific bar code according to claim 13, wherein if the color information is superimposed on the nulls, the color information is at least one color within a varying range from pure red to light green.

15. The specific bar code according to claim 14, wherein the at least one color includes a color with saturation greater than or equal to 90% and lightness greater than or equal to ½ if hue is greater than or equal to 0° and less than or equal to 60°.

16. The specific bar code according to claim 14, wherein the at least one color includes a color with saturation greater than or equal to 90% and lightness greater than or equal to ¾ if hue is greater than or equal to 60° and less than or equal to 90°.

17. The specific bar code according to claim 13, wherein if the color information is superimposed on the bars, the color information is at least one color within a varying range from pure green to reddish brown.

18. The specific bar code according to claim 17, wherein the at least one color includes a color with lightness less than or equal to ½ if hue is greater than 120° and less than or equal to 300°.

19. The specific bar code according to claim 17, wherein the at least one color includes a color with saturation less than or equal to 50% and lightness less than or equal to ¼ if hue is greater than 300° and less than or equal to 330°.

20. The specific bar code according to claim 13, wherein if the grayscale information is superimposed on the bars, under a standard of 100 grayscale levels and 0 for pure white and 100 for pure black, the grayscale information is information with grayscale greater than or equal to 40.

21. The specific bar code according to claim 13, wherein if the grayscale information is superimposed on the nulls, under a standard of 100 grayscale levels and 0 for pure white and 100 for pure black, the grayscale information is information with grayscale less than or equal to 10.

22. The specific bar code according to claim 12, wherein when identifying the specific bar code, information of the one-dimensional bar code and the color information and/or grayscale information are identified by the device, and the identified information of the one-dimensional bar code in conjunction with the identified color information and/or grayscale information causes the specific bar code to have a feature of one code for one article.

* * * * *